United States Patent
Plummer

(10) Patent No.: US 11,174,964 B2
(45) Date of Patent: Nov. 16, 2021

(54) POSITION TRANSMITTER ASSEMBLIES FOR USE WITH ACTUATORS

(71) Applicant: Fisher Controls International LLC, Marshalltown, IA (US)

(72) Inventor: Steven Plummer, New Albany, IN (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 94 days.

(21) Appl. No.: 16/661,714

(22) Filed: Oct. 23, 2019

(65) Prior Publication Data

US 2020/0132218 A1    Apr. 30, 2020

Related U.S. Application Data

(60) Provisional application No. 62/752,115, filed on Oct. 29, 2018.

(51) Int. Cl.
| | |
|---|---|
| *F16K 37/00* | (2006.01) |
| *F16K 31/524* | (2006.01) |
| *F16H 25/12* | (2006.01) |

(52) U.S. Cl.
CPC ....... *F16K 37/0041* (2013.01); *F16H 25/125* (2013.01); *F16K 31/5245* (2013.01);
(Continued)

(58) Field of Classification Search
CPC ......... F16K 31/52408; F16K 31/52433; F16K 31/52475; F16K 31/5245; F16K 37/0025; F16K 37/0033; F16K 37/0041
See application file for complete search history.

(56) References Cited

U.S. PATENT DOCUMENTS

| | | | | |
|---|---|---|---|---|
| 4,746,772 A | * | 5/1988 | Bovee | G05D 3/12 200/17 R |
| 6,007,047 A | * | 12/1999 | Phipps | F16K 31/528 251/129.01 |

(Continued)

FOREIGN PATENT DOCUMENTS

| | | |
|---|---|---|
| DE | 10 2014 211639 A1 | 12/2015 |
| KR | 20170060762 A | 6/2017 |

OTHER PUBLICATIONS

International Search Report and Written Opinion for PCT/US2019/058426, dated Feb. 12, 2020.

*Primary Examiner* — Atif H Chaudry
(74) *Attorney, Agent, or Firm* — Marshall, Gerstein & Borun LLP

(57) ABSTRACT

Position transmitter assemblies for use with actuators are disclosed. A position transmitter assembly for use with an actuator stem of an actuator includes a mounting bracket arranged for attachment to the actuator. The position transmitter assembly includes a position transmitter operatively coupled to the mounting bracket, the position transmitter including a position sensor or a feedback array. The position transmitter assembly includes an arm. The arm includes a first portion and a second portion. The other of the feedback array or the position sensor is mounted to the first portion. The position sensor is responsive to the feedback array to enable the position transmitter to determine a position of the actuator. The position transmitter assembly includes a cam assembly arranged between the actuator stem and the arm. The cam assembly is to cause the arm and the feedback array to linearly move when the actuator stem is rotating.

17 Claims, 10 Drawing Sheets

(52) U.S. Cl.
CPC .. *F16K 31/52433* (2013.01); *F16K 31/52475* (2013.01); *F16K 37/0025* (2013.01)

(56) References Cited

U.S. PATENT DOCUMENTS

| | | | |
|---|---|---|---|
| 7,190,159 B2* | 3/2007 | Galbreath | G01D 5/145 |
| | | | 324/207.2 |
| 2003/0172754 A1* | 9/2003 | Groeneveld | F16K 37/0008 |
| | | | 74/25 |
| 2004/0083997 A1 | 5/2004 | Shibata et al. | |
| 2008/0061769 A1* | 3/2008 | Junk | F16K 37/0033 |
| | | | 324/207.22 |

* cited by examiner

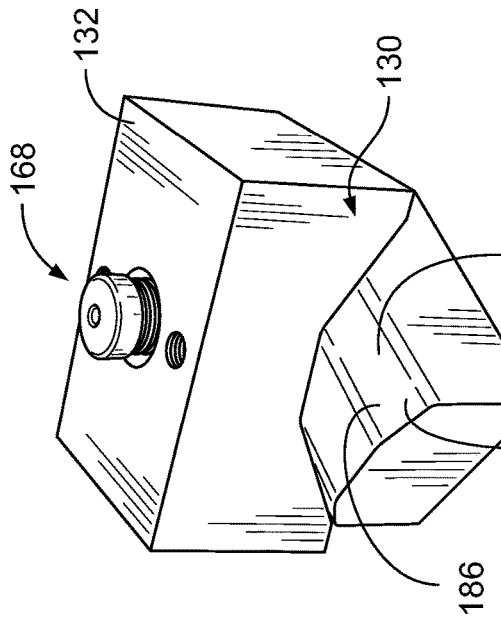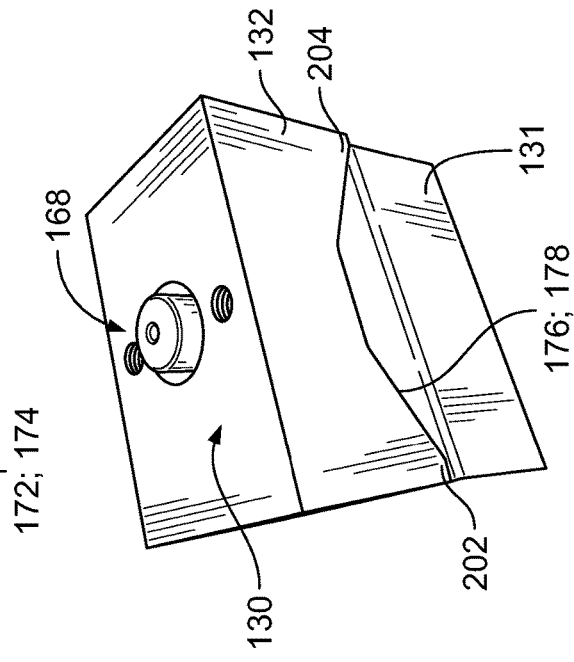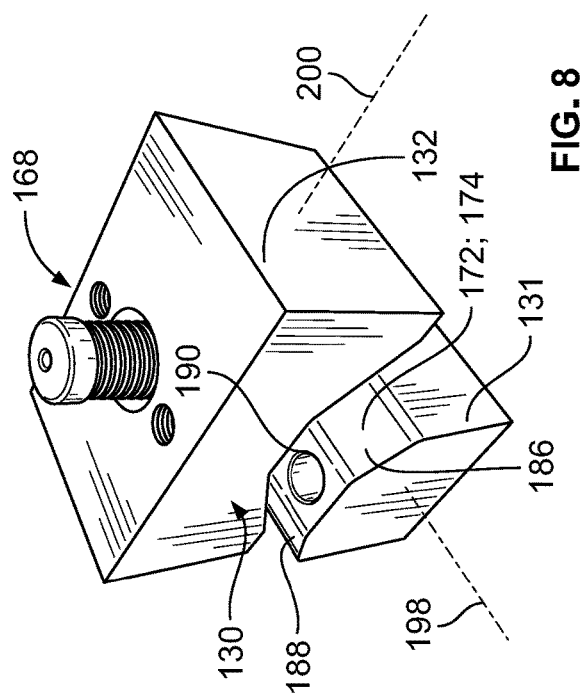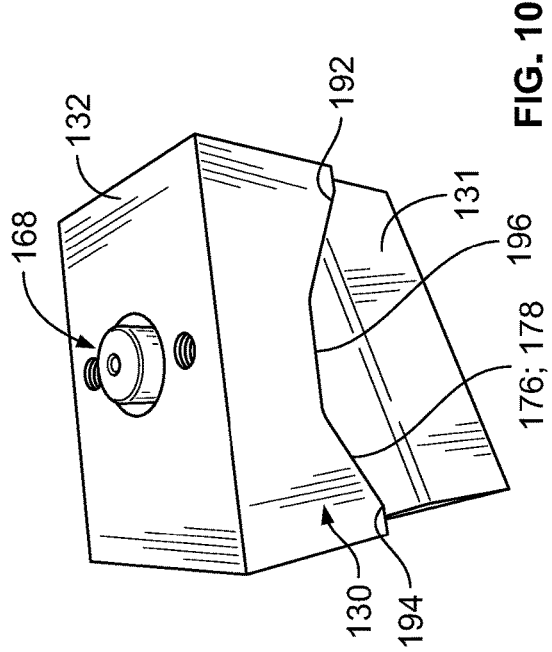

POSITION TRANSMITTER ASSEMBLIES FOR USE WITH ACTUATORS

FIELD OF THE DISCLOSURE

The present patent relates generally to position transmitter assemblies and, in particular, to position transmitter assemblies for use with actuators.

BACKGROUND

Some actuators and valves have two phases of actuation. In a first phase, an actuator stem of the actuator is linearly moved. In a second phase of the actuation, the actuator stem is rotationally moved. During the first phase of actuation, a valve plug controlled by the actuator may block fluid flow through the valve and, during the second phase of actuation, the valve plug may enable fluid flow through the valve.

SUMMARY

In accordance with a first example, a position transmitter assembly for use with an actuator stem of an actuator includes a mounting bracket arranged for attachment to the actuator. The position transmitter assembly includes a position transmitter operatively coupled to the mounting bracket. The position transmitter assembly includes an arm. The arm includes a first portion and a second portion. The arm is movable relative to the position transmitter. Based on a position of the arm and a relative position between a position sensor and a feedback array, the position sensor is to determine a position of the actuator. The position transmitter assembly includes an anti-rotation bracket coupled to the mounting bracket. The anti-rotation bracket includes a slot. The arm is positioned in the slot to prevent the arm from rotating. The position transmitter assembly includes a cam assembly including a cam and a follower. The cam is arranged for attachment to the actuator stem. The follower is coupled to the arm at the second portion of the arm. The cam includes a convex profile and the follower includes a concave profile. The coupling between the follower and the arm and an interaction between the arm and the anti-rotation bracket prevents the follower from rotating. The convex and concave profiles are arranged such that: 1) in a first position of the cam, the convex and concave profiles matingly engage and axes of the cam and the follower are substantially perpendicular; 2) in a second position of the cam, first surfaces defining the convex profile engage second surfaces defining the convex profile, thereby causing the follower to linearly move relative to the cam, in the second position, the axes of the cam and the follower are between being substantially perpendicular relative to one another and being substantially parallel relative to one another; and 3) in a third position of the cam, the follower is further linearly moved relative to the cam, in the third position, the axes of the cam and the follower are substantially parallel relative to one another.

In accordance with a second example, a position transmitter assembly for use with an actuator stem of an actuator includes a mounting bracket arranged for attachment to the actuator. The position transmitter assembly includes a position transmitter operatively coupled to the mounting bracket. The position transmitter includes a position sensor or a feedback array. The position transmitter assembly includes an arm. The arm includes a first portion and a second portion. The other of the feedback array or the position sensor is mounted to the first portion. The position sensor is responsive to the feedback array to enable the position transmitter to determine a position of the actuator. The position transmitter assembly includes a cam assembly arranged between the actuator stem and the arm. The cam assembly is to cause the arm and the feedback array to linearly move when the actuator stem is rotating.

In accordance with a third example, a position transmitter assembly for use with an actuator stem of an actuator includes a mounting bracket arranged for attachment to the actuator. The position transmitter assembly includes a position transmitter coupled to the mounting bracket. The position transmitter includes a position sensor or a feedback array. The position transmitter assembly includes an arm. The arm includes a first portion and a second portion. The other of the position sensor or the feedback array is mounted to the first portion. The position sensor is responsive to the feedback array to enable the position transmitter to determine a position of the actuator. The position transmitter assembly includes means for linearly moving the arm and the feedback array when the actuator stem is rotating.

In further accordance with the foregoing first, second and/or third examples, an apparatus and/or method may further include any one or more of the following:

In accordance with one example, the first surfaces include a first tapered surface, a second tapered surface, and a first central surface. The first central surface is positioned between the first and second tapered surfaces. The second surfaces include a third tapered surface, a fourth tapered surface, and a second central surface. The second central surface is positioned between the third and fourth tapered surfaces. When the axes of the cam and the follower are substantially perpendicular, the first tapered surface matingly engages the third tapered surface, the first central surface matingly engages the second central surface, and the second tapered surface matingly engages the fourth tapered surface.

In accordance with another example, when the cam is rotated, the first tapered surface is moved against and relative to the third tapered surface and the second tapered surface is moved against and relative to the fourth tapered surface to linearly move the follower relative to the cam.

In accordance with another example, the position transmitter assembly further includes a coupler to couple the cam to the actuator stem. The coupler includes a first side bracket, a second side bracket, and a second bracket. The first and second side brackets are arranged to be clamped on either side of the actuator stem via first fasteners and the second bracket is arranged to be coupled to the first and second side brackets via second fasteners.

In accordance with another example, further including an angle bracket including a first portion and a second portion. The first portion is coupled to a flat surface of the follower and the second portion is coupled to the arm. The flat surface is positioned opposite the second surfaces defining the concave profile.

In accordance with another example, the anti-rotation bracket includes a first leg, a second leg, and a third leg. The second leg is positioned between the first and third legs. The slot includes a first slot and a second slot. The first and second legs define the first slot and the third leg defines the second slot.

In accordance with another example, the arm includes a first portion and a second portion substantially perpendicular to the first portion. The first portion is coupled to the follower and received within the first slot. The second portion carries the feedback array and is received within the second slot.

In accordance with another example, the position transmitter assembly further includes a spring-biased fastener assembly. The spring-biased fastener assembly couples the cam and the follower to urge the follower into engagement with the cam.

In accordance with another example, the cam assembly includes a cam and a follower. The cam is arranged for attachment to the actuator stem. The follower is coupled to the arm at the second portion of the arm.

In accordance with another example, the cam includes a convex profile and the follower includes a concave profile.

In accordance with another example, the position transmitter assembly includes an anti-rotation bracket coupled to the mounting bracket. The anti-rotation bracket includes a slot. The arm is positioned in the slot to prevent the arm from rotating. The convex and concave profiles of the cam and the follower are arranged such that when the cam is rotated, via the actuator stem, first surfaces defining the convex profile engage second surfaces defining the convex profile, thereby causing the follower to linearly move relative to the cam.

In accordance with another example, the coupling between the follower and the arm and an interaction between the arm and the anti-rotation bracket prevents the follower from rotating.

In accordance with another example, the first surfaces include a first tapered surface, a second tapered surface, and a first central surface. The first central surface is positioned between the first and second tapered surfaces. The second surfaces include a third tapered surface, a fourth tapered surface, and a second central surface. The second central surface is positioned between the third and fourth tapered surfaces. When axes of the cam and the follower are substantially perpendicular, the first tapered surface matingly engages the third tapered surface, the first central surface matingly engages the second central surface, and the second tapered surface matingly engages the fourth tapered surface.

In accordance with another example, the position transmitter assembly further includes a coupler to couple the cam to the actuator stem. The coupler includes a first side bracket, a second side bracket, and a second bracket. The first and second side brackets are arranged to be clamped on either side of the actuator stem via first fasteners and the second bracket is arranged to be coupled to the first and second side brackets via second fasteners.

In accordance with another example, the means for linearly moving the arm and the feedback array includes a cam, a follower, and an anti-rotation bracket. The cam and the follower are arranged between the actuator stem and the arm. The anti-rotation bracket is coupled to the mounting bracket.

In accordance with another example, the anti-rotation bracket includes a slot. The arm is positioned in the slot to prevent the arm from rotating.

In accordance with another example, the cam is arranged for attachment to the actuator stem. The follower is coupled to the arm at the second portion of the arm. The coupling between the follower and the arm and an interaction between the arm and the anti-rotation bracket prevents the follower from rotating.

In accordance with another example, the cam includes a convex profile and the follower includes a concave profile. The convex and concave profiles are arranged such that when the cam is rotated, via the actuator stem, first surfaces defining the convex profile engage second surfaces defining the convex profile, thereby causing the follower to linearly move relative to the cam.

In accordance with another example, the means for linearly moving the arm and the feedback array includes a cam and a follower. The cam and the follower are arranged between the actuator stem and the arm.

BRIEF DESCRIPTION OF THE DRAWINGS

FIGS. 8-11 illustrate the cam of the cam assembly rotating and the follower of the cam assembly linearly moving in response to the rotation of the cam.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
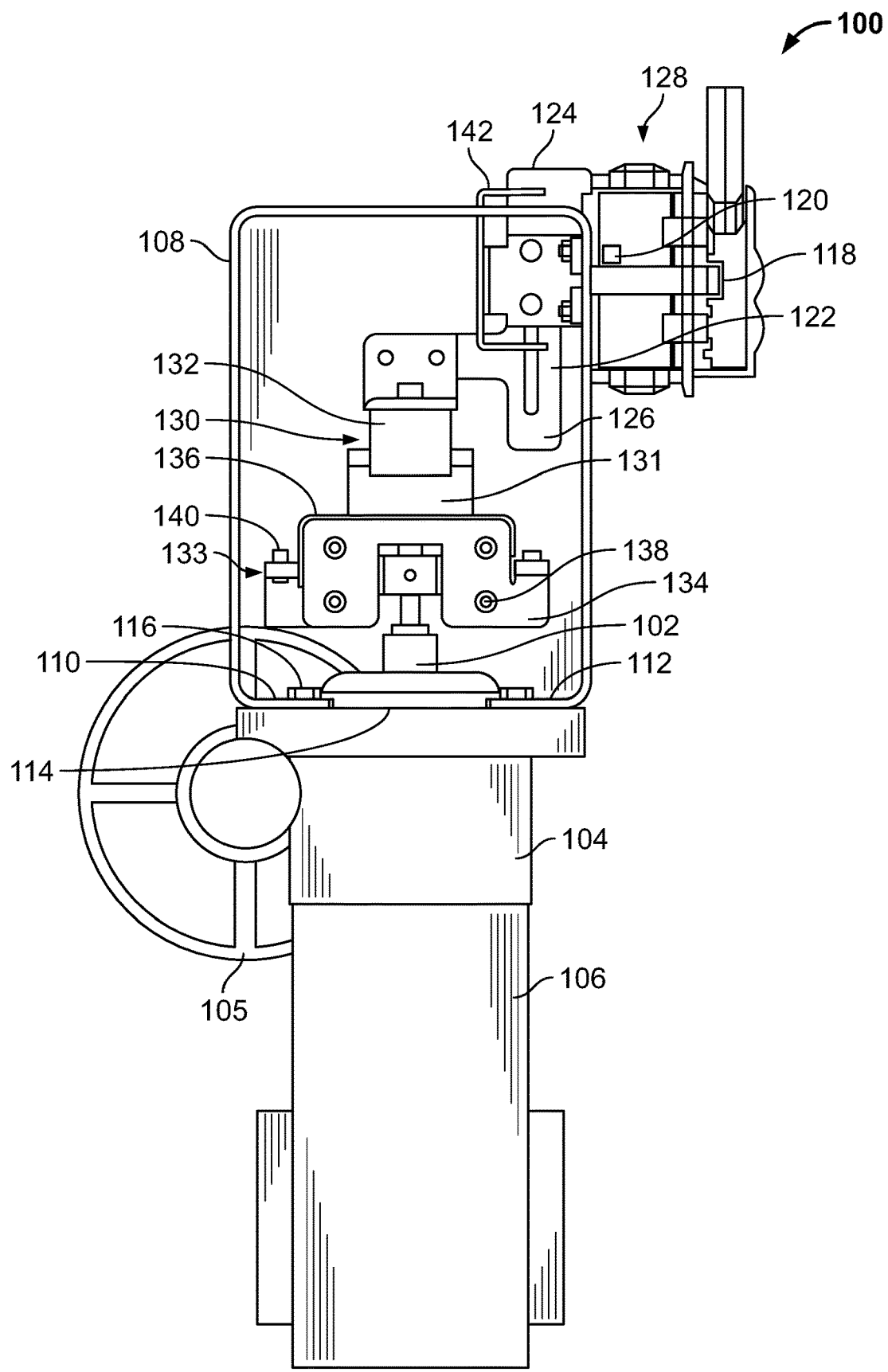
FIG. 1 illustrates a side view of an example position transmitter assembly coupled to an actuator and a valve.

Referring now to the drawings, FIG. 1 illustrates an example position transmitter assembly 100 assembled in accordance with a first disclosed example of the present invention. In accordance with the disclosed example, the position transmitter assembly 100 is arranged for use with an actuator stem 102 of an actuator 104 that is coupled to a valve 106.

The actuator 104 may be a twin seal actuator and the valve 106 may be a twin seal valve. Twin seal actuators may linearly move the actuator stem 102 during a first phase of actuation and then rotationally move the actuator stem 102 during a second phase of the actuation. During the first phase of actuation, a valve plug controlled by the actuator may block fluid flow through the valve and, during the second phase, the valve plug may enable fluid flow through the valve. While the actuator 104 is mentioned being implemented by a twin seal actuator, the actuator 104 may be implemented by any other type of actuator (e.g., a linear actuator, a rotary actuator). Similarly, while the valve 106 is mentioned being implemented by a twin seal valve, the valve 106 may be implemented by any other type of actuator (e.g., a linear valve, a rotary valve). The actuator 104 includes a hand wheel 105 that is rotatable to enable an operator to actuate the actuator 104.

The position transmitter assembly 100 includes a mounting bracket 108 arranged for attachment to the actuator 104. The mounting bracket 108 is U-shaped and includes inward facing mounting flanges 110, 112 that are arranged to abut a face 114 of the actuator 104. In other examples, the mounting bracket 108 is formed of multiple portions (e.g., two portions) that are coupled. Other arrangements may prove suitable. Fasteners 116 extend through the mounting flanges 110, 112 to couple the mounting bracket 108 to the actuator 104.

The position transmitter assembly 100 also includes a position transmitter 118 coupled to the mounting bracket 108. The position transmitter 118 may be any form of position monitor, such as, a wireless position transmitter or a wired position transmitter. Still other position monitors may prove suitable. When the position transmitter 118 is a wired position transmitter, the position transmitter 118 may be a digital valve controller. The digital valve controller may monitor the position of the actuator 104 but may, in some examples, not be configured to control the actuation of the actuator 104. The position transmitter 118 includes a position sensor 120. The position sensor 120 may be, for example, a Hall Effect sensor, although other position sensors may prove suitable.

The position transmitter assembly 100 includes an arm 122 having a first end 124 and a second end 126. A feedback array 128 is mounted to or adjacent the first end 124 of the arm 122. The position sensor 120 is responsive to the feedback array 128 to enable the position transmitter 120 to determine a position of the actuator 104. The feedback array 128 may be a magnet array that travels within a groove 129 (not visible in FIG. 1 but visible in FIG. 7) of the position transmitter 118. The groove 129 is oriented substantially parallel to the direction of travel. The position sensor 120 may be a Hall Effect sensor that detects the relative position of the magnet array within the groove 129. Based on the position of the magnet array, the position sensor 120 can determine the position of the valve 106 (e.g., an open position, a closed position). However, while the feedback array 128 is shown moving relative to the position sensor 120, alternatively, the position sensor 120 may be moved relative to the feedback array 128. In such an alternative, the feedback array 128 may be carried by the position transmitter 118 and the position sensor 120 may be carried by the arm 122.

The position transmitter assembly 100 includes a cam assembly 130. The cam assembly 130 includes a cam 131 and a follower 132. Details of the cam 131 and the follower 132 are further described in connection with FIGS. 8-11. The cam 131 and the follower 132 are shown as blocks that matingly engage one another when the valve 106 is in the closed position shown in FIG. 1. While the cam 131 and the follower 132 are shown having a particular profile, the cam 131 and the follower 132 can be differently implemented. For example, the cam 131 and the follower 132 can be any type of prism with corresponding tapered surfaces that enable rotary motion of the cam 131 to translate into linear movement of the follower 132.

The cam 131 is arranged for attachment to the actuator stem 102 via a coupler 133. The coupler 133 includes side brackets 134 and a top bracket 136. While the top bracket 136 is shown as a U-shaped bracket, the top bracket 136 may have any other profile. The side brackets 134 are arranged to be clamped on either side of the actuator stem 102 via first fasteners 138 and the top bracket 136 is arranged to be coupled to the side brackets 134 via second fasteners 140. In some examples, the side brackets 134 and the top bracket 135 are adjustable (e.g., via slots) to enable a face of the top bracket 135 to be substantially perpendicular relative to a longitudinal axis of the mounting bracket 108. The follower 132 is arranged for attachment to the arm 122 as discussed in more detail in connection with FIG. 2. The position transmitter assembly 100 includes an anti-rotation bracket 142 coupled to the mounting bracket 108.

Figure 2:
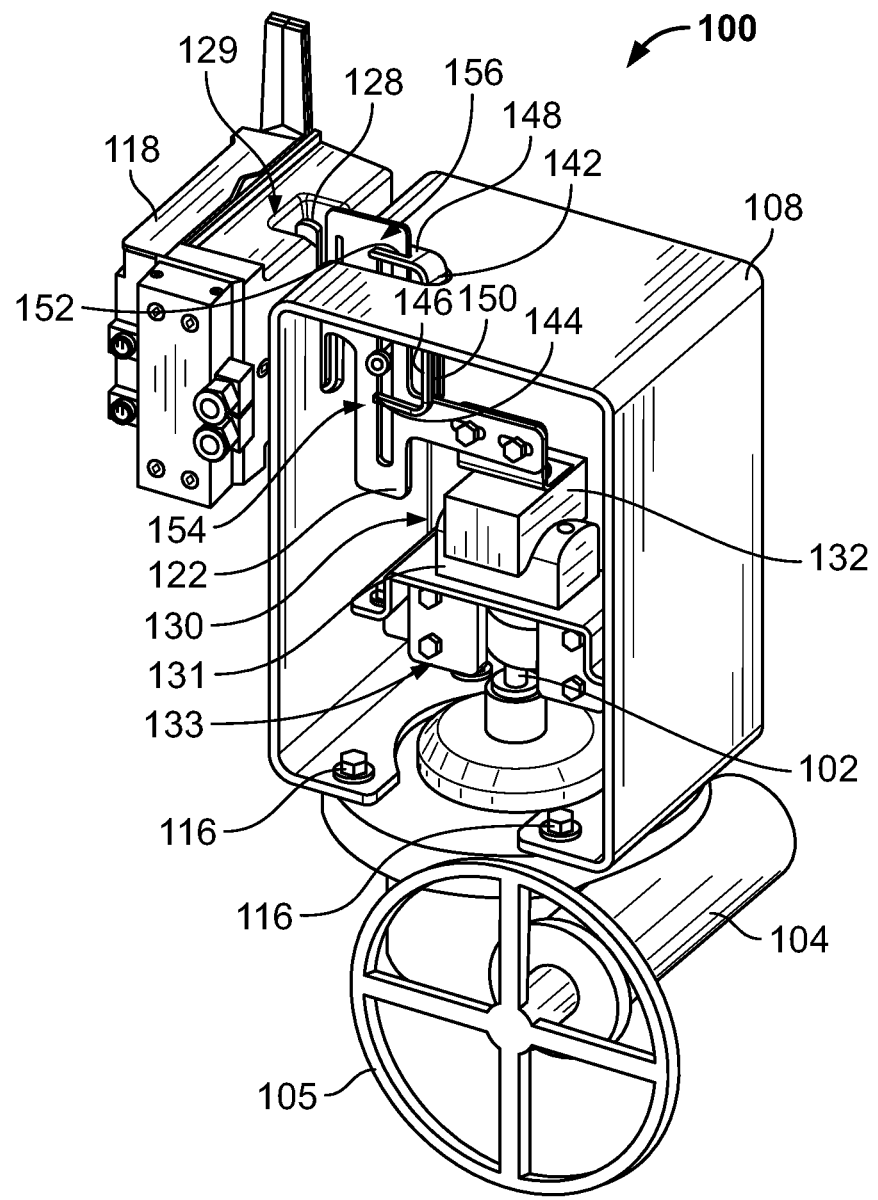
FIGS. 2-4 illustrate an actuator stem of the actuator linearly moving a cam assembly of the position transmitter assembly of FIG. 1.

Referring now to FIG. 2, the anti-rotation bracket 142 is a U-shaped bracket and includes a first leg 144, a second leg 146 and a third leg 148, where the second leg 146 is positioned between the first and third legs 144,148. A first slot 150 is defined by the first and second legs 144, 146 and a second slot 152 is defined by the third leg 148. The slots 150, 152 include openings 154, 156 to receive first and second portions 158, 160 of the arm 122 (the first and second portions 158, 160 of the arm 122 are labeled in FIG. 3). The first and second portions 158, 160 of the arm 122 are positioned within the slots 150, 152 to prevent the arm 122 from rotating.

Figure 3:
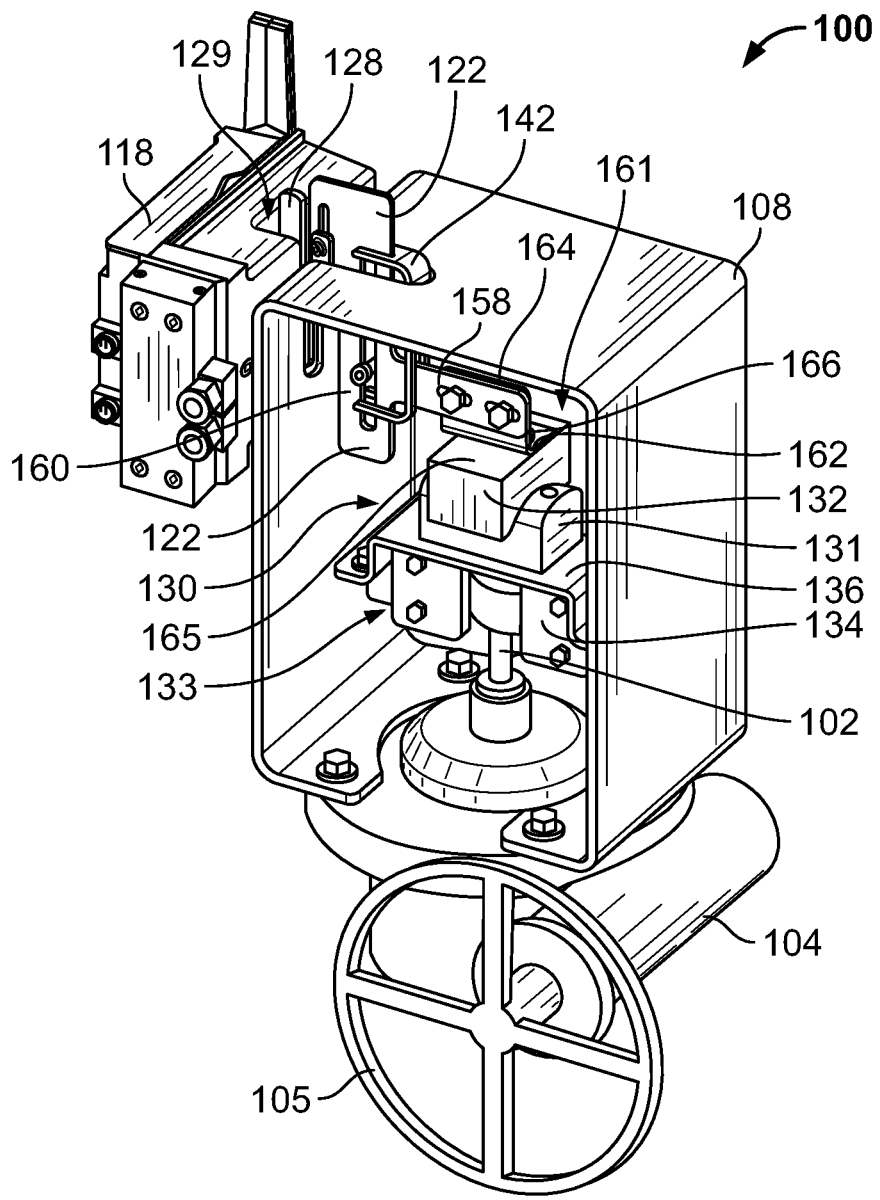

Referring now to FIG. 3, the arm 122 is coupled to the follower 132. Based on the coupling between the follower 132 and the arm 122 and an interaction between the arm 122 and the anti-rotation bracket 142, the follower 132 is prevented from rotating. The first portion 158 of the arm 122 extends substantially perpendicularly relative to the second portion 160 of the arm 122. However, the first and second portions 158, 160 may be positioned at any angle relative to one another. In the example shown, the first portion 158 of the arm 122 is coupled to the follower 132 via an angle bracket 161. The angle bracket 161 includes a first portion 162 and a second portion 164. The first portion 162 is coupled to a flat surface 165 of the follower 132 via fasteners 166.

Figure 4:
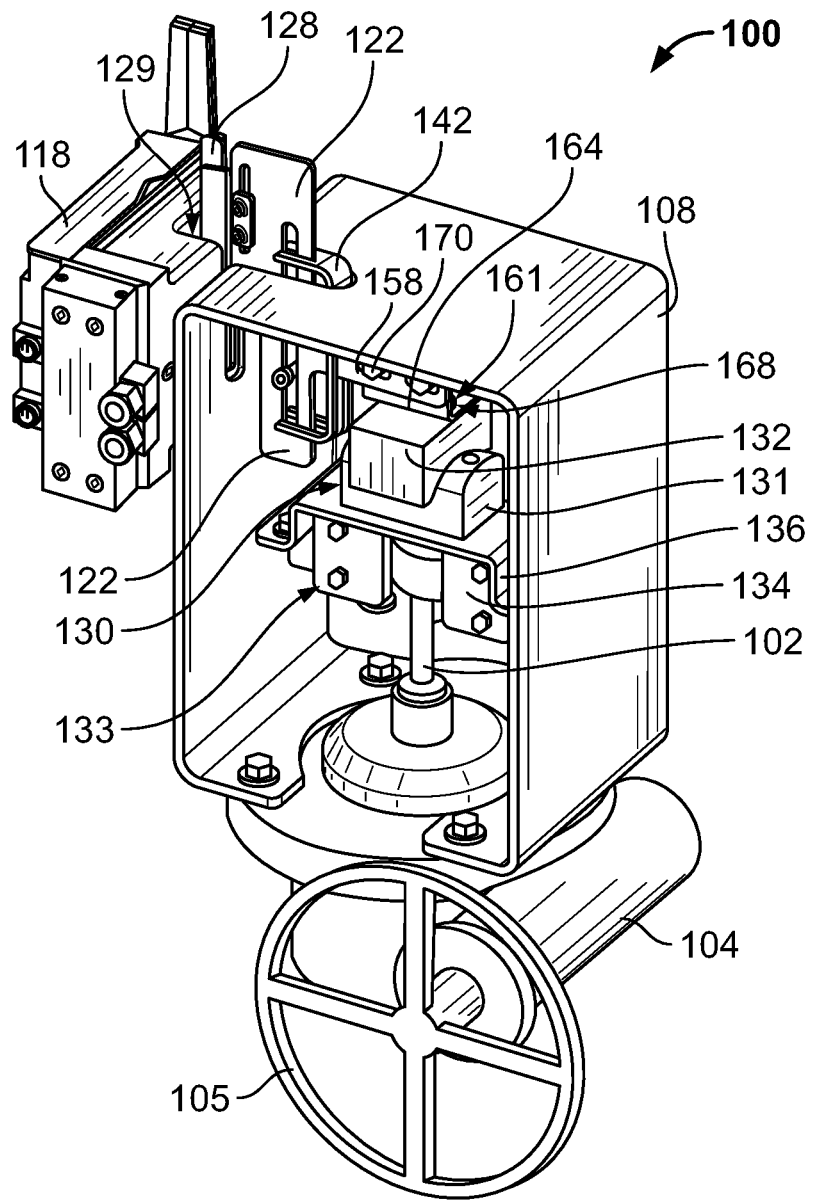

Referring now to FIG. 4, a spring-biased fastener assembly 168 couples the cam 131 and the follower 132 together. The spring-biased fastener assembly 168 urges the follower 132 into engagement with the cam 131 and enables the cam 131 to rotate relative to the follower 132 without binding. The spring-biased fastener assembly 168 is described in more detail in connection with FIG. 7. The second portion 164 of the angle bracket 161 is coupled to the arm 122 via fasteners 170. The fasteners 170 extend through the angle bracket 161 and the first portion 158 of arm 122.

Figure 5:
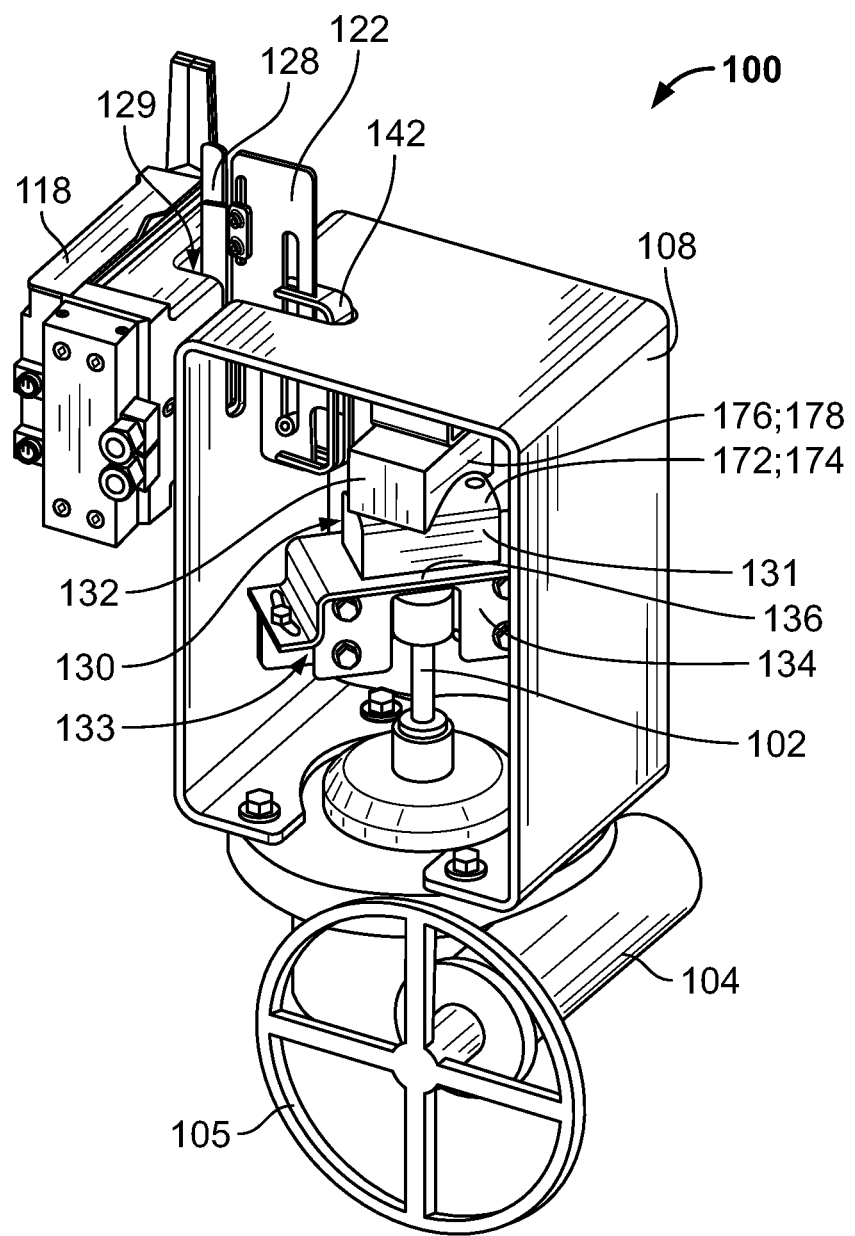
FIGS. 5 and 6 illustrate the actuator stem and a cam of the cam assembly rotating and a follower of the cam assembly linearly moving in response to the rotation of the cam.
Figure 6:
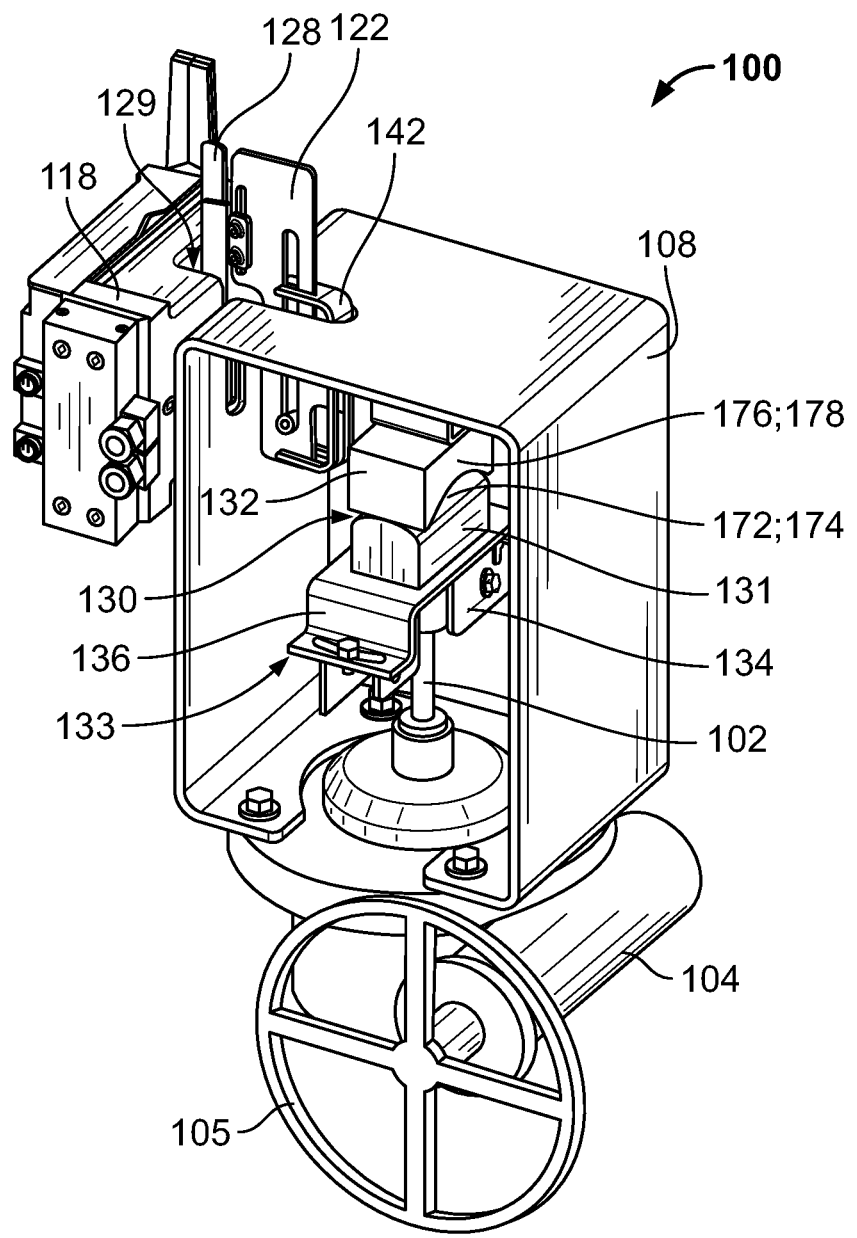

Referring now to FIGS. 5 and 6, the cam 131 includes a convex profile 172 defined by first surfaces 174 and the follower 132 includes a concave profile 176 defined by second surfaces 178. As shown in FIGS. 5-6, the convex and concave profiles 172, 176 are arranged such that when the cam 131 is rotated, via the actuator stem 102, the first surfaces 174 defining the convex profile 172 engage the second surfaces 178 defining the concave profile 176. The interaction between the first and second surfaces 174, 178 causes the follower 132 to linearly move relative to the cam 131 as the cam 131 is rotated.

By the cam assembly 130 converting the rotary movement of the actuator stem 102 to linear movement of the arm 122, the position transmitter assembly 100 can accurately monitor the position of the valve 106 through both the first phase of actuation in which the actuator stem 102 and the associated valve plug move linearly shown in FIGS. 2-4 and during the second phase of actuation in which the actuator stem 102 and the associated valve plug move rotationally approximately 90° between the closed position and the open position shown in FIGS. 5 and 6.

Figure 7:
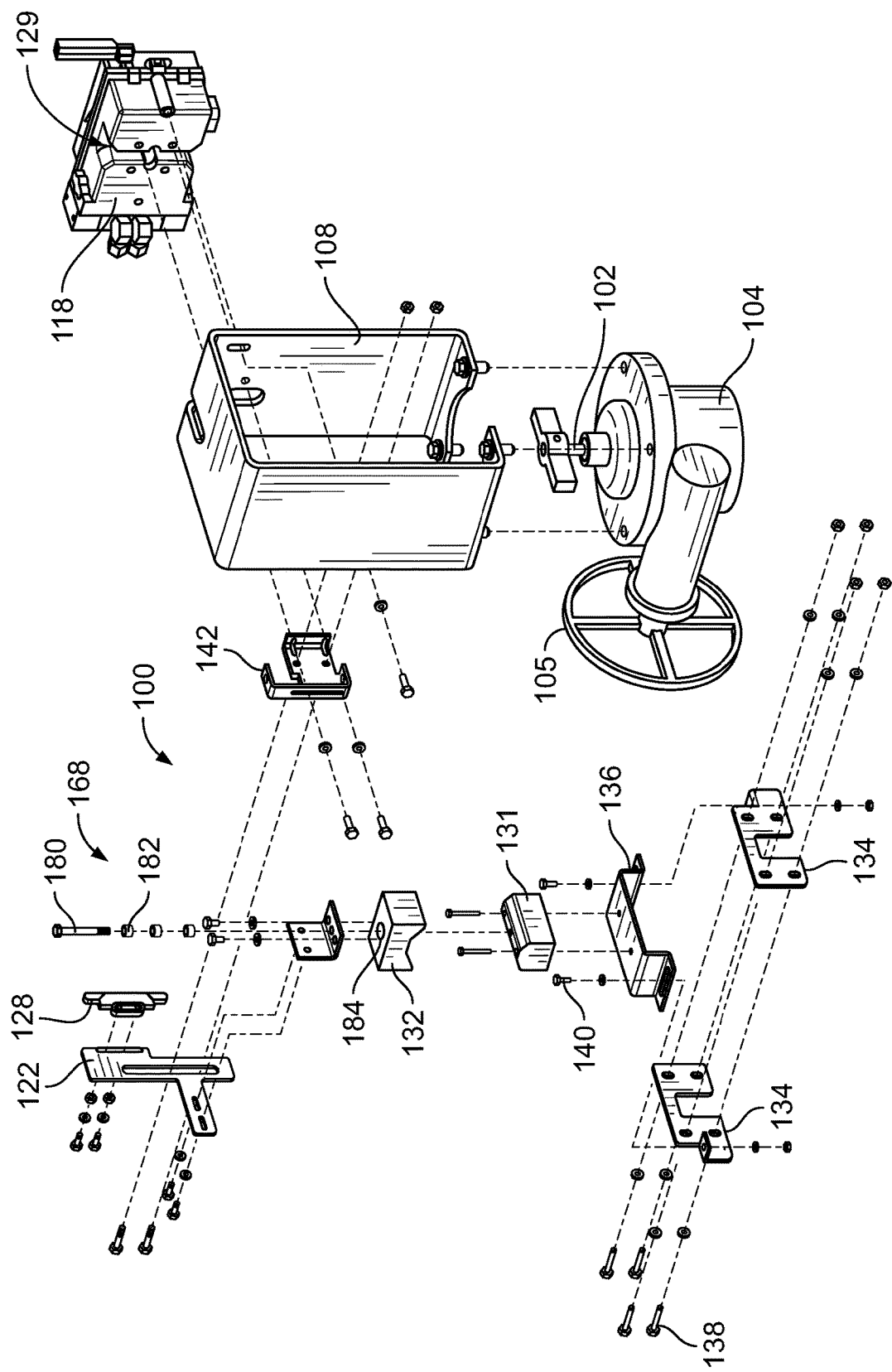
FIG. 7 illustrates an expanded view of the position transmitter assembly and the actuator of FIG. 1.

Referring now to FIG. 7, an expanded view of the position transmitter assembly 100 is shown including details of the spring-biased fastener assembly 168. The spring-biased faster assembly 168 includes a fastener 180 and springs 182. The springs 182 are received within an aperture 184 of the follower 132 and the fastener 180 is positioned through the springs 182 and the follower 132 and threadably engages the cam 131. The fastener 180 is shown as a shoulder bolt and the springs 182 are shown as wave springs. Other fasteners and/or biasing members may prove suitable. The coupling between the cam 131 and the follower 132, via the spring-biased fastener assembly 168, urges the follower 132 into engagement with the cam 131 while deterring the cam 131 and the follower 132 from binding during such relative movement.

Referring now to FIGS. 8 and 9, the first surfaces 174 defining the convex profile 172 of the cam 131 include a first tapered surface 186, a second tapered surface 188 and a first central surface 190. The first central surface 190 is positioned between the first and second tapered surfaces 186, 188. While the tapered surfaces 186, 188 are shown at approximately 30°, the cam 131 can have any other profile (e.g., half round) that mates with the follower 132.

Referring now to FIGS. 10 and 11, the second surfaces 178 defining the concave profile 176 of the follower 132 include a third tapered surface 192, a fourth tapered surface 194 and a second central surface 196. The second central surface 196 is positioned between the third and fourth tapered surfaces 192, 196. While the tapered surfaces 192, 196 are shown at approximately 30°, the follower 132 can have any other profile (e.g., an aperture that receives a half round) that mates with the cam 131.

Referring to FIGS. 8-11 with reference to FIGS. 2-6, when the actuator 104 linearly moves the actuator stem 102 (shown in FIGS. 2-4 and 8), a first longitudinal axis 198 (shown in FIG. 8) of the cam 131 is substantially perpendicular to a second longitudinal axis 200 of the follower 132. As set forth herein, the phrase "substantially perpendicular" means +/−10° of perpendicular. When the axes 198, 200 are substantially perpendicular, the convex profile 172 is received by the convex profile 172 and, thus, the cam 131 and the follower 132 matingly engage.

When the actuator 104 rotates the actuator stem 102 (shown in FIGS. 5, 6, 9-11), the first tapered surface 186 of the cam 131 is moved against and relative to the third tapered surface 192 of the follower 132 and the second tapered surface 188 of the cam 131 is moved against and relative to the fourth tapered surface 194 of the follower 132 such that the axes 198, 200 of the cam 131 and the follower 132 are moved toward being substantially parallel. When the axes 198, 200 are substantially parallel, the actuator 104 is in the open position in this example. However, the actuator 104 can be differently arranged. As the tapered surfaces 186, 188, 192, 194 interact, the second central surface 196 of the follower 132 is moved away from the first central surface 190 of the cam 131 until portions 202, 204 of the follower 132 bounding the third and fourth tapered surfaces 192, 194 engage the first central surface 190 of the cam 131.

Figure 12:
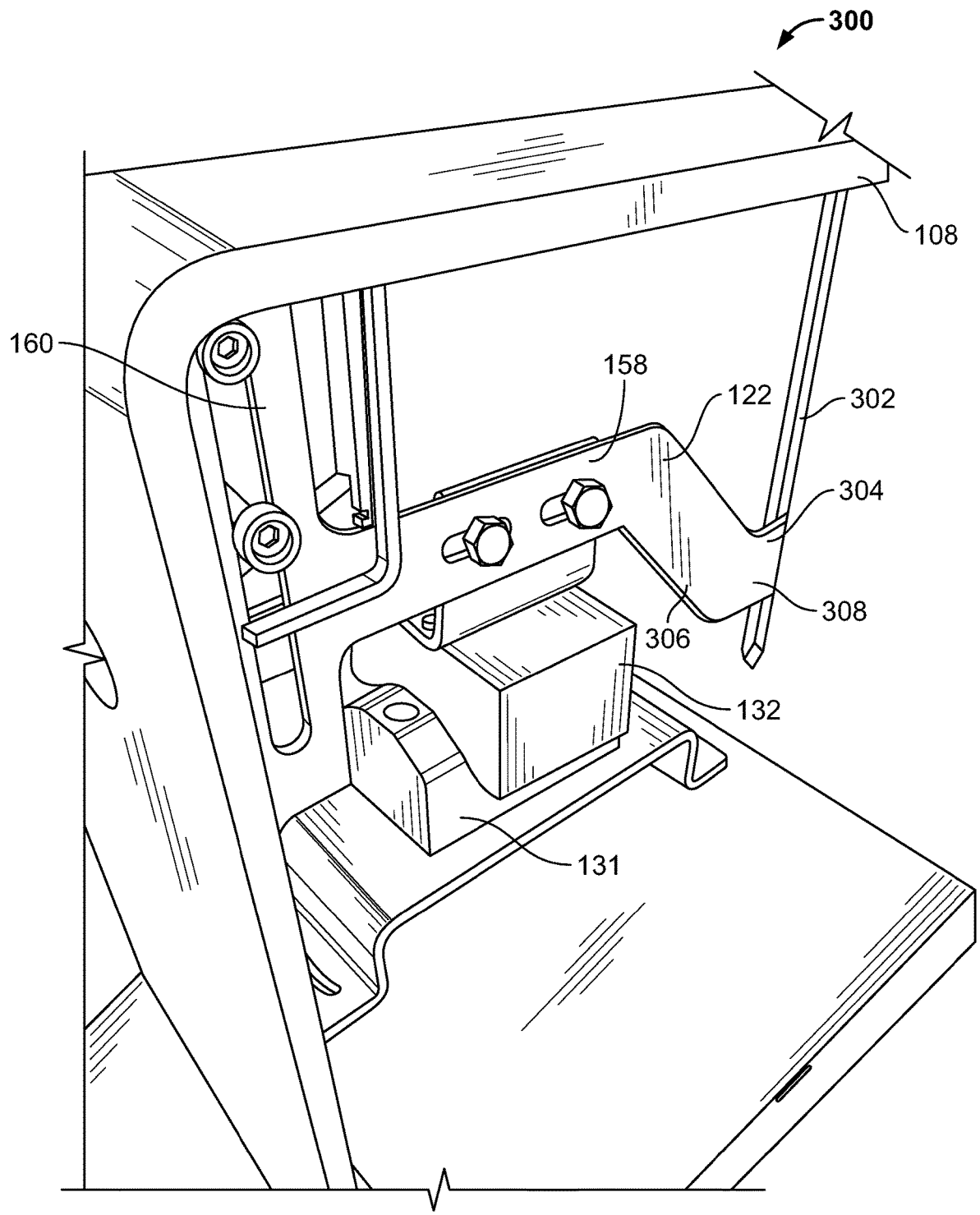
FIGS. 12-13 illustrate another position transmitter assembly in accordance with the teachings of this disclosure.
Figure 13:
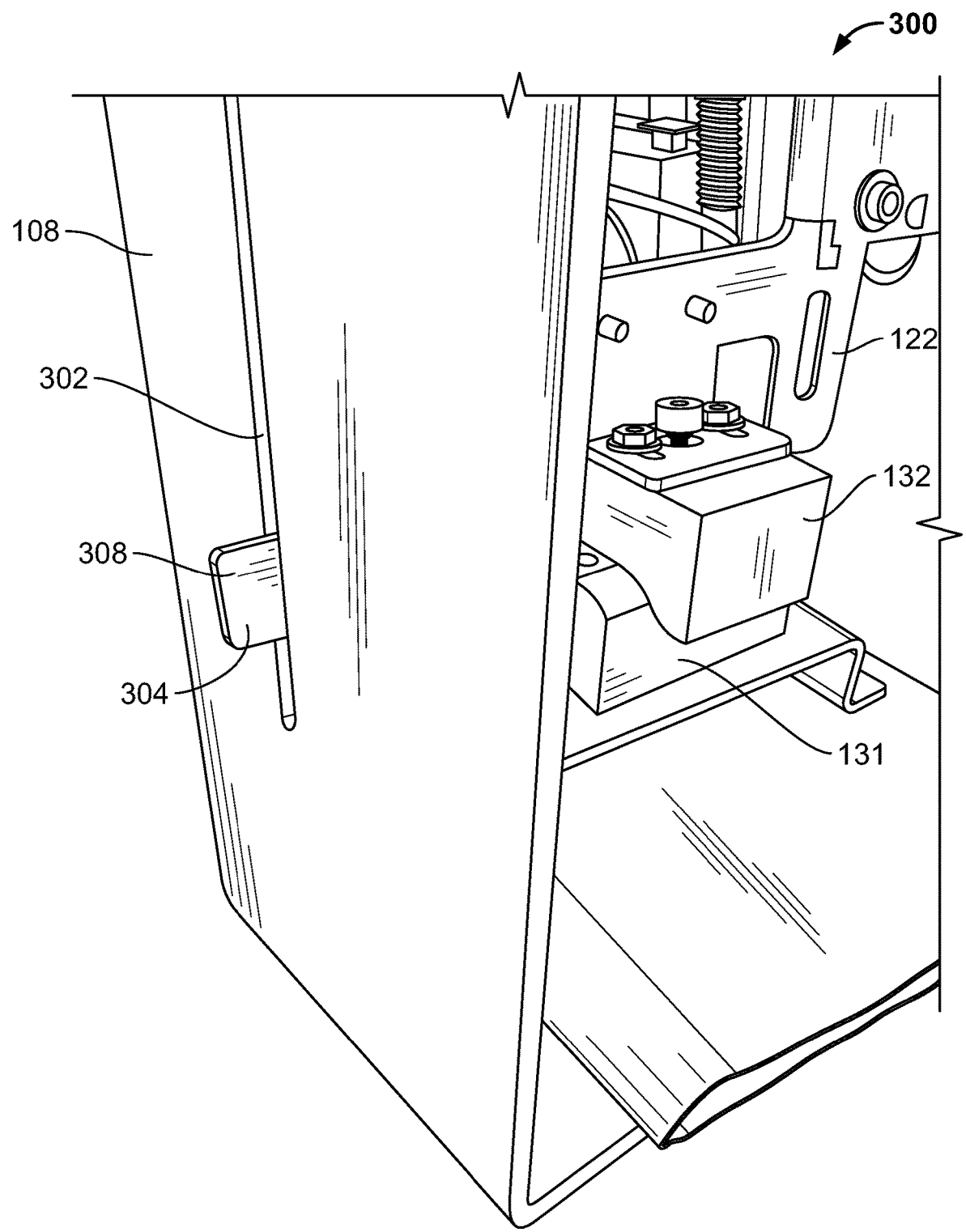

Referring now to FIGS. 12 and 13, another position transmitter assembly 300 assembled in accordance with a second disclosed example of the present invention is shown. In accordance with the disclosed example, the position transmitter assembly 300 is similar to the position transmitter assembly of FIG. 1. However, in contrast to the position transmitter assembly 100 of FIG. 1, the bracket 108 of the position transmitter assembly 300 of FIGS. 12 and 13 includes a slot 302 that receives an extension 304 of the arm 122. The slot 302 is oriented substantially parallel to the direction of travel of the arm 122.

The arm 122 of the second example includes the first portion 158, the second portion 160, a third portion 306 and a fourth portion 308, where the fourth portion 308 is positioned through the slot 302. An interaction between the extension 304 and the slot 302 prevents the follower 132 from rotating. While the third portion 306 extends at approximately a 45° relative to the first and fourth portions 158, 308, the third portion 306 may positioned at any angle relative to the first and fourth portions 158, 308 or the first portion 158 may extend directly through the slot 302 without including the jog of the third portion 306.

From the foregoing, it will be appreciated that the above disclosed apparatus, methods and articles of manufacture enable the position of twin seal valves and twin seal actuators to be accurately determined throughout both a linear movement phase of the actuator stem and a rotary movement phase of the actuator stem. To accurately determine the position of such valves and actuators using a linear position transmitter, the disclosed examples arrange a cam and a follower between the actuator stem and the position transmitter. To ensure proper alignment and to prevent the cam and the follower from binding during relative movement, the follower is coupled to and biased into engagement with the cam.

The cam includes a first block (a lower block) coupled to the actuator stem and the follower includes second block (an upper block). A magnet array is coupled to the follower and the position transmitter is responsive to the magnet array. The cam and the follower include corresponding contours to enable the cam and the follower to matingly engage and also to encourage lateral movement of the follower in response to rotational movement of the cam. To ensure that the follower does not rotate with the cam when the actuator is in the rotary movement phase, an anti-rotation bracket guides the movement of the follower.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed is:

1. A position transmitter assembly for use with an actuator stem of an actuator, the position transmitter assembly, comprising:
   a mounting bracket arranged for attachment to the actuator;
   a position transmitter operatively coupled to the mounting bracket;
   an arm, the arm including a first portion and a second portion, the arm being movable relative to the position transmitter, based on a position of the arm and a relative position between a position sensor and a feedback array, the position sensor to determine a position of the actuator;
   an anti-rotation bracket coupled to the mounting bracket, the anti-rotation bracket including a slot, the arm is positioned in the slot to prevent the arm from rotating;
   a cam assembly including a cam and a follower, the cam is arranged for attachment to the actuator stem, the follower is coupled to the arm at the second portion of the arm, the cam includes a convex profile and the follower includes a concave profile,
   wherein the coupling between the follower and the arm and an interaction between the arm and the anti-rotation bracket prevents the follower from rotating, and wherein the convex and concave profiles are arranged such that: 1) in a first position of the cam, the convex and concave profiles matingly engage and axes of the cam and the follower are substantially perpendicular; 2) in a second position of the cam, first surfaces defining the convex profile engage second surfaces defining the concave profile, thereby causing the follower to linearly move relative to the cam, in the second position, the axes of the cam and the follower are between being substantially perpendicular relative to one another and being substantially parallel relative to one another; and 3) in a third position of the cam, the follower is further linearly moved relative to the cam, in the third position, the axes of the cam and the follower are substantially parallel relative to one another.

2. The position transmitter assembly of claim 1, wherein the first surfaces include a first tapered surface, a second tapered surface, and a first central surface, the first central surface being positioned between the first and second tapered surfaces, and wherein the second surfaces include a third tapered surface, a fourth tapered surface, and a second central surface, the second central surface positioned between the third and fourth tapered surfaces, and wherein when the axes of the cam and the follower are substantially perpendicular, the first tapered surface matingly engages the third tapered surface, the first central surface matingly engages the second central surface, and the second tapered surface matingly engages the fourth tapered surface.

3. The position transmitter assembly of claim 2, wherein, when the cam is rotated, the first tapered surface is moved against and relative to the third tapered surface and the second tapered surface is moved against and relative to the fourth tapered surface to linearly move the follower relative to the cam.

4. The position transmitter assembly of claim 1, further including a coupler to couple the cam to the actuator stem, the coupler including a first side bracket, a second side bracket, and a second bracket, the first and second side brackets are arranged to be clamped on either side of the actuator stem via first fasteners and the second bracket is arranged to be coupled to the first and second side brackets via second fasteners.

5. The position transmitter assembly of claim 1, further including an angle bracket including a first portion and a second portion, the first portion is coupled to a flat surface of the follower and the second portion is coupled to the arm, wherein the flat surface is positioned opposite the second surfaces defining the concave profile.

6. The position transmitter assembly of claim 1, wherein the anti-rotation bracket includes a first leg, a second leg, and a third leg, the second leg positioned between the first and third legs, and wherein the slot includes a first slot and a second slot, the first and second legs define the first slot and the third leg defines the second slot.

7. The position transmitter assembly of claim 6, wherein the arm includes a first portion and a second portion substantially perpendicular to the first portion, the first portion coupled to the follower and received within the first slot, the second portion carrying the feedback array and received within the second slot.

8. The position transmitter assembly of claim 1, further including a spring-biased fastener assembly, the spring-biased fastener assembly coupling the cam and the follower to urge the follower into engagement with the cam.

9. A position transmitter assembly for use with an actuator stem of an actuator, the position transmitter assembly, comprising:
a mounting bracket arranged for attachment to the actuator;
a position transmitter operatively coupled to the mounting bracket, the position transmitter including a position sensor or a feedback array;
an arm, the arm including a first portion and a second portion, the other of the feedback array or the position sensor mounted to the first portion, the position sensor being responsive to the feedback array to enable the position transmitter to determine a position of the actuator; and
a cam assembly arranged between the actuator stem and the arm, the cam assembly to cause the arm and the feedback array to linearly move when the actuator stem is rotating,
wherein the cam assembly includes a cam and a follower, the cam is arranged for attachment to the actuator stem and includes a convex profile, the follower is coupled to the arm at the second portion of the arm and includes a concave profile.

10. The position transmitter assembly of claim 9, further including an anti-rotation bracket coupled to the mounting bracket, the anti-rotation bracket includes a slot, the arm is positioned in the slot to prevent the arm from rotating, wherein the convex and concave profiles of the cam and the follower are arranged such that when the cam is rotated, via the actuator stem, first surfaces defining the convex profile engage second surfaces defining the convex profile, thereby causing the follower to linearly move relative to the cam.

11. The position transmitter assembly of claim 10, wherein the coupling between the follower and the arm and an interaction between the arm and the anti-rotation bracket prevents the follower from rotating.

12. The position transmitter assembly of claim 10, wherein the first surfaces include a first tapered surface, a second tapered surface, and a first central surface, the first central surface being positioned between the first and second tapered surfaces, and wherein the second surfaces include a third tapered surface, a fourth tapered surface, and a second central surface, the second central surface positioned between the third and fourth tapered surfaces, and wherein when axes of the cam and the follower are substantially perpendicular, the first tapered surface matingly engages the third tapered surface, the first central surface matingly engages the second central surface, and the second tapered surface matingly engages the fourth tapered surface.

13. The position transmitter assembly of claim 12, further including a coupler to couple the cam to the actuator stem, the coupler including a first side bracket, a second side bracket, and a second bracket, the first and second side brackets are arranged to be clamped on either side of the actuator stem via first fasteners and the second bracket is arranged to be coupled to the first and second side brackets via second fasteners.

14. A position transmitter assembly for use with an actuator stem of an actuator, the position transmitter assembly, comprising:
a mounting bracket arranged for attachment to the actuator;
a position transmitter coupled to the mounting bracket, the position transmitter including a position sensor or a feedback array;
an arm, the arm including a first portion and a second portion, the other of the position sensor or the feedback array mounted to the first portion, the position sensor being responsive to the feedback array to enable the position transmitter to determine a position of the actuator; and
means for linearly moving the arm and the feedback array when the actuator stem is rotating, wherein the means for linearly moving the arm and the feedback array includes a cam, a follower, and an anti-rotation bracket, the cam and the follower are arranged between the actuator stem and the arm, the anti-rotation bracket is coupled to the mounting bracket, wherein the cam is arranged for attachment to the actuator stem, the follower is coupled to the arm at the second portion of the arm, and wherein the coupling between the follower and the arm and an interaction between the arm and the anti-rotation bracket prevents the follower from rotating.

15. The position transmitter assembly of claim 14, wherein the anti-rotation bracket includes a slot, the arm is positioned in the slot to prevent the arm from rotating.

16. The position transmitter assembly of claim 14, wherein the cam includes a convex profile and the follower includes a concave profile, wherein the convex and concave profiles are arranged such that when the cam is rotated, via the actuator stem, first surfaces defining the convex profile engage second surfaces defining the convex profile, thereby causing the follower to linearly move relative to the cam.

17. The position transmitter assembly of claim 14, wherein the means for linearly moving the arm and the feedback array includes a cam and a follower, the cam and the follower are arranged between the actuator stem and the arm.

\* \* \* \* \*